United States Patent
Lashina et al.

(10) Patent No.: US 9,370,079 B2
(45) Date of Patent: Jun. 14, 2016

(54) METHODS AND APPARATUS FOR AUTOMATICALLY ADAPTING LIGHT OUTPUT OF A LIGHTING UNIT

(71) Applicant: KONINKLIJKE PHILIPS N.V., Eindhoven (NL)

(72) Inventors: Tatiana Aleksandrovna Lashina, Eindhoven (NL); Dzmitry Viktorovich Aliakseyeu, Eindhoven (NL); Bartel Marinus Van De Sluis, Eindhoven (NL); Bram Knaapen, Eindhoven (NL); Anthonie Hendrik Bergman, Nuenen (NL); Jonathan David Mason, Waalre (NL); Tim Dekker, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/409,171

(22) PCT Filed: Jun. 18, 2013

(86) PCT No.: PCT/IB2013/054996
§ 371 (c)(1),
(2) Date: Dec. 18, 2014

(87) PCT Pub. No.: WO2014/001965
PCT Pub. Date: Jan. 3, 2014

(65) Prior Publication Data
US 2015/0145419 A1    May 28, 2015

Related U.S. Application Data

(60) Provisional application No. 61/665,027, filed on Jun. 27, 2012.

(51) Int. Cl.
*H05B 37/02* (2006.01)
*H05B 33/08* (2006.01)

(52) U.S. Cl.
CPC ........ *H05B 37/0227* (2013.01); *H05B 33/0854* (2013.01); *H05B 33/0872* (2013.01); *H05B 37/0218* (2013.01); *Y02B 20/46* (2013.01)

(58) Field of Classification Search
None
See application file for complete search history.

(56) References Cited

U.S. PATENT DOCUMENTS 4,884,008 A * 11/1989 Bossler .................. F21V 14/04
315/152
5,038,261 A    8/1991 Kloos
(Continued)

FOREIGN PATENT DOCUMENTS

WO    9522741 A1    8/1995
WO    2010083047 A1    7/2010

*Primary Examiner* — Jany Richardson
(74) *Attorney, Agent, or Firm* — Meenakshy Chakravorty (57) ABSTRACT

Methods and apparatus related to controlling illumination on a lighting unit (10). The method includes reading orientation data from an orientation sensor (17) on the lighting unit as well as reading distance data from a distance sensor (15) on the lighting unit. A controller (63) is provided to control various light output surfaces (12) on the lighting unit. Once the controller determines the orientation of the lighting unit as well as distance data of the lighting unit from external structures or luminaire structures, the controller adjusts various light output characteristics of the lighting unit. The method may additionally include a memory storage which allows the controller to compare read data with stored data to determine an associated light fixture type for automated commissioning. Alternatively, the lighting unit can reconfigure itself to output light in various orientations based upon said read data.

19 Claims, 5 Drawing Sheets

(56) References Cited

U.S. PATENT DOCUMENTS

| | | | |
|---|---|---|---|
| 5,068,767 A * | 11/1991 | Koyama | F21S 2/00 315/152 |
| 2008/0192459 A1 | 8/2008 | Kwok | |
| 2010/0181938 A1 | 7/2010 | Boleko Ribas et al. | |
| 2011/0222301 A1 | 9/2011 | Knoedgen et al. | |
| 2013/0106312 A1 * | 5/2013 | Beardsley | H05B 37/0272 315/312 |

* cited by examiner

FIG. 7

METHODS AND APPARATUS FOR AUTOMATICALLY ADAPTING LIGHT OUTPUT OF A LIGHTING UNIT

CROSS-REFERENCE TO PRIOR APPLICATIONS

This application is the U.S. National Phase application under 35 U.S.C. §371 of International Application No. PCT/IB2013/054996, filed on Jun. 18, 2013, which claims the benefit of U.S. Provisional Patent Application No. 61/665,027, filed on Jun. 27, 2012. These applications are hereby incorporated by reference herein.

TECHNICAL FIELD

The present invention is directed generally to the automatic configuration and control of a lighting unit, as well as a plurality of light sources within the lighting unit or luminaire. More particularly, various inventive methods and apparatus disclosed herein relate to automatically adaptable output characteristics and control of the lighting unit depending upon its installation conditions, locality, spatial orientation, luminaire design and the like.

BACKGROUND

Conventional luminaires are typically designed with fixed output characteristics and dedicated functionality. For example, a spotlight luminaire is manufactured for a singular purpose to direct a narrow beam of light into a room and/or onto an object with a particular performance and light output characteristics. These luminaires are specifically constructed to achieve maximum efficiency given their dedicated functionality and purpose. As a result, a large number of lighting products are provided by manufacturers to cater to these various installation and application requirements. Such a large volume of products and variant units leads to higher costs in manufacturing, storage and overhead.

Another issue with conventional light fixtures is the improper installation of some luminaires into environments in which they were not intended. For example, some luminaires intended for wall washing or sconce-type lighting may be incorrectly installed in a configuration wherein the light output is not efficiently utilized for illumination of the room. Such installation wastes energy while also incorrectly and inefficiently illuminating a desired area. These luminaires, while configurable at the manufacturing location, typically cannot inherently correct their light output after installation based on environmental criteria.

As another example, many luminaires have alterable output characteristics, such as intensity or color control. In such installations, users must have access to the luminaire or have access to controls (i.e. through software or hardware such as switches) which modifies the light output based upon direct user input. In these situations as well, a user control interface must be integrated within the control systems of the luminaire or remote control interface. Unfortunately, light output is defined by how the luminaire is mounted and oriented relative to the ceiling or other structures. As a result, fixed output construct of luminaires or light fixtures are not readily transferrable from a first install orientation to a second non-related install orientation.

Thus, conventional dedicated luminaires suffer from one or more drawbacks and there is a need in the art to provide a lighting unit capable of being automatically reconfigured based upon detected values, such as lighting unit orientation, distance to other surfaces such as ceilings, walls, working surfaces, illumination surfaces and the like and lighting conditions, all of which may be optionally used to overcome one or more drawbacks of existing approaches.

SUMMARY

The present disclosure is directed to inventive methods and apparatus for adapting a lighting unit to vary one of a number of light output characteristics based upon detected environmental conditions. For example, a lighting unit is provided which includes a plurality of light sources, the lighting sources controlled by a controller and the light output characteristics of the light unit and/or the luminaire modified based upon sensed mounting characteristics. Such lighting unit, or a luminaire employing it, may utilize a distance sensor to measure the distance to associated and adjacent structures, such as walls or ceilings to determine appropriate light output functionality. Further, both the orientation of the lighting unit and the detected distance data may be combined to better determine the appropriate mounting orientation, adjacent structures and appropriate light output characteristics given the sensed data. Lighting surfaces on the lighting unit or within the luminaire can then be selected given the sensed orientation. Also, or in the alternative, the sensed data can be compared to stored data in a memory storage unit that lists output characteristics for said sensed data and associated luminaire type information so that the lighting unit can automatically reconfigure itself and output light with appropriate light output characteristics. This associated data can include the specific luminaire type, in which the lighting unit is installed.

Generally, in one aspect, the invention relates to a controllable lighting unit adaptable to environmental installation conditions. The lighting unit may adjust the light output of the light sources based upon installed parameters which may be sensed by various sensors, including a distance sensor and an orientation sensor. The apparatus also includes a controller which is either electrically connected to the light sources or which may be in controlling communication thereto. Such control connectivity can be, for example, a wireless control bridge. The controller reads the data from the sensors to modify at least one light output characteristic of the light sources in the lighting unit. The controller modifies such light output characteristics based upon the data received from the orientation sensor and the distance sensor.

In some embodiments, the at least one light emission surface includes a plurality of LEDs. In some embodiments, the at least one lighting module is a first light source and a second light source emitting light in opposing directions.

The at least one modified light characteristic may include direction and/or distribution shape of light emitted by said light emission surface, In various embodiments, the orientation sensor is a three axis electronic accelerometer.

In some embodiments, the lighting unit includes a first and a second light source having respective first and second light emission surfaces. Further, the controller modifying the direction of light emission from the lighting unit does so based on the data from the orientation sensor or the distance sensor.

In some embodiments, the lighting unit includes a memory storage unit and a controller which is configured to access the memory storage unit and compare the data from the orientation sensor and the distance sensor to stored values on the memory storage unit. Once retrieved and compared, the stored values may include associated light characteristic values related to the data from the distance sensor and the orientation sensor.

In some embodiments, the associated light characteristic value includes a luminaire type. In some versions of those embodiments the lighting unit includes a light sensor electronically connected to the controller. In other versions and embodiments, the lighting unit can have a controller which is in wireless communication and de-coupled from the lighting units. In such embodiments, a dedicated communication unit in the luminaire can be utilized to maintain controlling communication with the controller.

Generally, in another aspect, the invention relates to a method for controlling illumination generated by a lighting unit. The method may include determining an orientation of the lighting unit by reading orientation data from an orientation sensor. The method may further include determining a distance value for the lighting unit by reading distance data from a distance sensor. Once read, the method may include adjusting at least one light output characteristic of said lighting unit based on the orientation data and the distance data.

In some embodiments, the at least one light output characteristic includes a light output direction and/or distribution shape.

In some embodiments, the step of adjusting at least one light output characteristic is based on comparing the orientation data and the distance data to a plurality of table data, said table data including an associated luminaire type related to said distance data and said orientation data.

In some embodiments the adjusting step includes selectively activating at least of a plurality of lighting surfaces mounted on said lighting unit.

In some embodiments, the adjusting step includes controlling a plurality of LEDs using a controller to modify the at least one light output characteristic.

Generally, in another aspect, the invention relates to an LED-based lighting unit with alterable light output having a first and a second light source electronically connected to a controller. At least one light sensor is electronically connected to the controller and associated with the first light source. The controller is connected to at least one distance sensor and also associated with the first light source. At least one orientation sensor is also electronically connected to the controller and further associated with said first light source. The first light source may be mounted relative to a first light output axis and the second light source may be mounted relative to a second light output axis different than said first light output axis.

In some embodiments, the lighting unit may include a memory storage unit associated with the controller.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs).

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, etc.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

The terms "luminaire" and "lighting fixture" are used interchangeably herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources and/or daylight blocking elements. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure focuses on lighting units, and luminaires employing them, which can detect environmental variables and adjust their light output upon sensed installation and orientation data, thereby increasing their usability and efficiency of manufacture. Such multifunctional lighting units may adapt their light output parameters based upon how it is mounted, including orientation, luminaire design, distance to illumination target and other factors. These measurements can be taken from sensors placed directly on the lighting unit itself or, in other embodiments, in associated structures. By allowing automated commissioning of the lighting unit to adapt its light output to account for specific sensed data related to environmental conditions and installation parameters, the lighting unit or fixture can automatically reorient itself from one dedicated form to an alternative form without user or operator intervention. Such automated adjustment can be, for example, from a wall wash or up-lighting illumination and the like, to a down-lighting configuration, based upon sensed criteria of spatial orientation of the luminaire.

Accordingly, disclosed herein is individualized and particularized control of light output at the lighting unit or luminaire level wherein light output characteristics may be modified based upon installation characteristics. This includes providing a multifunctional lighting unit that may adapt itself and its lighting effects based upon how and where it is mounted, luminaire design characteristics, installation height and locations, among many factors. Modification of various light output characteristics may be appropriate and desirable based upon such factors thereby allowing an adaptable lighting unit which utilizes sensor data to automatically detect and create lighting effects based upon various detected environmental factors and conditions.

Additional embodiments and structures utilize control of lighting effects and lighting characteristics when a lighting unit is installed into a fixture. The lighting unit thereby being adaptable to detected properties of a lighting fixture/luminaire. Sensor data may be utilized within the lighting unit to detect appropriate lighting fixture/luminaire design thereby adjusting at least one of a plurality of light output characteristics in reference to such detected properties. In various embodiments, the lighting unit may utilize previously stored lighting fixture characteristics to compare detected properties for appropriate adaptation or modification of light output of the lighting unit or light emission surfaces.

Thus, Applicants have recognized and appreciated the need to provide a lighting unit which detects such environmental data and that allow for modification and adaptation of light output characteristics based upon such sensed data. These various embodiments and methods overcome one or more drawbacks of existing approaches, particularly those which only allows for fixed light output specifications.

More generally, Applicants have recognized and appreciated that it would be beneficial to adapt light output characteristics for a lighting unit based upon intrinsic sensed data.

In view of the foregoing, various embodiments and implementations are directed to mounting based adaptable luminaires and lighting units which are automatically adjustable and modifiable depending on installation properties. Such embodiments and implementations allow a lighting unit to adapt and modify itself to sensed data regarding orientation of the lighting unit and distance to an illumination target. Embodiments allow the lighting unit to adapt and modify the light output of a plurality of light sources to create individualized light output characteristics appropriate to installed and detected orientation and other sensed properties.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, a lighting unit having a plurality of lighting surfaces may be provided which automatically adjust light output based upon distance to the ceiling or wall. For example, various other embodiments of the approach disclosed herein are discussed in conjunction with a control that controls one or more characteristics of a light unit or lighting fixture and one or more light output characteristics. However, other configurations, methods and applications of this approach are contemplated without deviating from the scope or spirit of the claimed invention. In some applications the approach may be implemented in conjunction with a plurality of lighting surfaces, a light unit or lighting fixture and a controller that controls one or more lighting surfaces or light emission devices.

In various embodiments, the described controller can be integrated as a master controller. Such individual controller or master controller can be utilized to control light output characteristics of a plurality of lighting units, luminaires or light output surfaces.

In other embodiments, the controller can be a remote controller which is in wireless communication with the luminaire. In various embodiments, the luminaire may also have a communication unit which wirelessly connects to the luminaire to control light output of the lighting units. In some embodiments, the remote controller can be a smart bridge to create a wireless control bridge that may analyze the data provided by the lighting unit or luminaire sensors and send calculated light parameters back to the light source through the communication unit. Such remote or direct connectivity may be incorporated within electronic connectivity, whether by wireless, direct wired or other controlling communication.

It is therefore desirable to provide a lighting fixture which is capable of creating different lighting effects and light output characteristics in order to set a desired type of light output based upon sensed data. It is further desirable to provide such a luminaire or lighting unit which can include built in sensors and/or control mechanisms which can detect how the lighting unit is installed, mounted and oriented relative to the ceiling, wall or permanent other structure.

In multiple embodiments, information and data may be utilized in order to automatically control and modify the light output instead of requiring explicit user control input. Optionally, automatic adjustment of a lighting unit light output characteristics is employed by modifying the plurality of lighting surfaces on the lighting unit. Optionally, a luminaire may be allowed to set its own lighting effects based on how it is mounted and oriented, all necessary parameters detected within the fixture or lighting unit in order to adjust appropriate light output characteristics.

Figure 1:
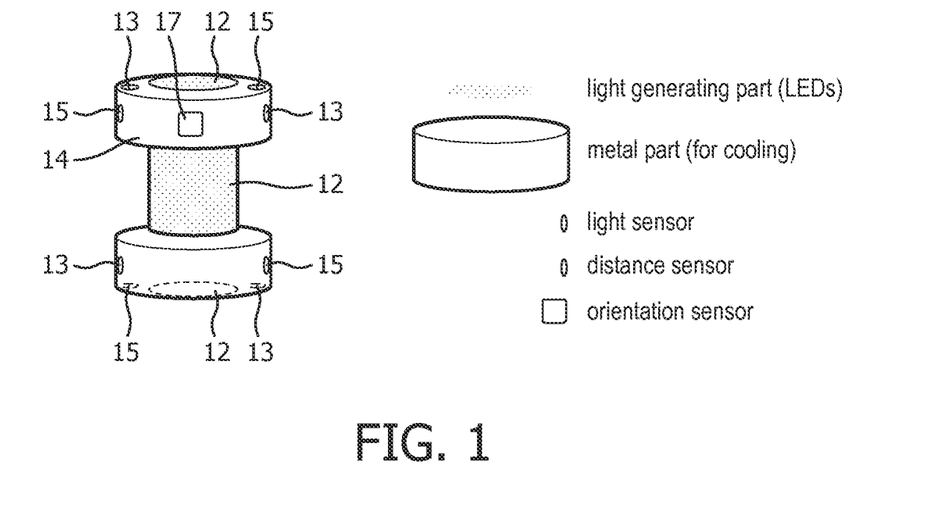
FIG. 1 illustrates an embodiment of a lighting unit associated with the description herein.

These and other benefits are achieved by utilizing an exemplary lighting unit 10 which incorporates a plurality of light emitting surfaces 12, as are depicted in FIG. 1. The light emitting surfaces may be optionally and varyingly positioned on a lighting unit 10. In some examples, a multi-effect lighting unit is provided capable of producing multiple lighting effects and modifying light output characteristics consequently or simultaneously. Light output from various light surfaces 12 may be configured such that it substantially corresponds to an installed position and location.

In other embodiments, light output characteristics may be determined dependent upon the luminaire configuration in which the lighting unit is installed or, alternatively, dependent upon specific sensed characteristics of the luminaire.

Figure 2A:
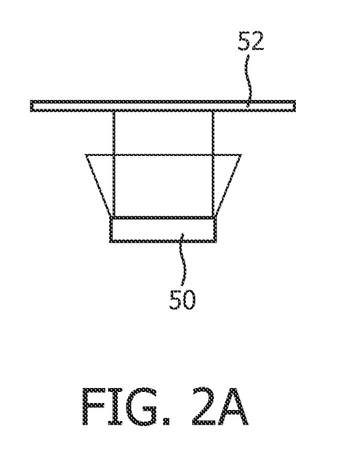
FIG. 2A illustrates an embodiment of an exemplary lighting fixture utilizing a modifiable lighting unit or other modifiable lighting source as described herein.
Figure 2B:
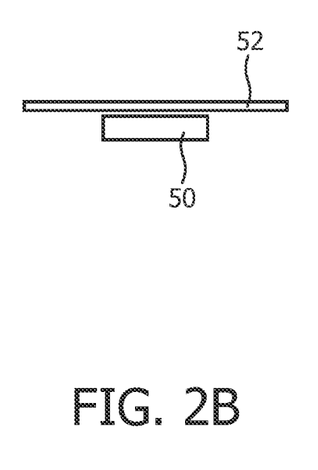
FIG. 2B illustrates another embodiment of an exemplary lighting fixture utilizing a modifiable lighting unit or other modifiable lighting source as described herein.
Figure 2C:
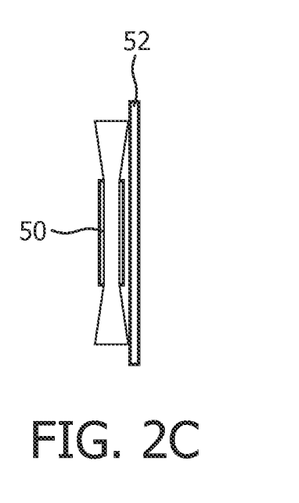
FIG. 2C illustrates a further embodiment of an exemplary lighting fixture utilizing a modifiable lighting unit or similar lighting source as described herein.

In some implementations and embodiments, the light output beam direction, beam shape, color temperature, intensity and/or direction of light output may be configured to substantially correspond to desired lighting effects dependent upon how the lighting unit and/or luminaire is mounted, including orientation of the lighting unit or luminaire 50, as shown in FIGS. 2A, 2B and 2C. One or more sensors may be provided to detect how the luminaire and/or lighting unit is mounted which includes orientation of the lighting unit or luminaire, distance between the lighting module or the luminaire and the install surface or as well the distance between the lighting unit, lighting surfaces and/or luminaire with the working surface to be illuminated. Thus, various properties of a physical install context such as distance to walls and ceilings, luminaire type, mounting properties such as distance to floors, ceilings and working surfaces to be illuminated, may be utilized to adjust and modify light output characteristics of each of the lighting units and thereby create desirable lighting effects.

As depicted in FIG. 1, an exemplary lighting unit 10 is shown which utilizes a plurality of lighting surfaces 12. Each of the lighting surfaces may be an LED based lighting source which may be altered and controlled utilizing a controller or other driver electronics. The controller 63 is provided to adjust and modifying the light output for the plurality of lighting sources and LEDs by known electronic controls. The controller may selectively activate certain of the LEDs installed on the lighting unit based upon detection of data and other information obtained implicitly from the lighting unit or a light fixture. The controlled light output and emission surfaces can, in various embodiments, be individual LEDs, LED arrays, PCBs, lighting units, lighting sources, subsets of light emission surfaces and the like.

As shown in FIG. 1, the lighting unit may, in some embodiments, incorporate a first and an opposing second lighting surface which emits light on opposing light output axis. Such light source 12 may emit light in a first upward direction, a second downward direction and, in other embodiments, a third outward direction based upon the placement and positioning of the plurality of lighting surfaces 12. As shown in example, three variable light surfaces may be employed in order to modify and adjust the light output characteristics and direction of the lighting unit 10. As well, the plurality of light sources may be individually mounted on a heat sink or other support structure 14 in order to properly mount the lighting material and structure, and in some embodiments, dissipate heat away from the light source thereby providing thermal dissipation of heat.

While many embodiments discussed herein include or embody LEDs and arrays of LEDs in conjunction with the light emission surfaces, such implementation is merely utilized for illustrative purposes only as various light emitting devices in planar, non-planar, point, non-point, solid state and other traditional form, as defined herein, may be utilized.

In the embodiment of FIG. 1, a first and a second planar light output surface are provided in opposing directions while a third annular light output surface is provided. Each of the light output surfaces may be adjusted in order to meet needed light output direction. No limitation from the specific construction of the embodiment shown in FIG. 1 should be interpreted as the various elements are provided for exemplary and descriptive purposes only as a varying number of light output surfaces may be provided. As well, singular light output surfaces may also be utilized where subsets of the light output surface may be controlled by the controller in order to modify the light output characteristics. Thus, singular surfaces, multiple surfaces, annular surfaces, segmented surfaces, separated surfaces, as well as combined, joined and subdivided surfaces are incorporated in the description hereof.

Combined with the plurality of lighting surfaces 12 shown in FIG. 1 may be a plurality of sensors. In various embodiments, the sensors installed in the lighting unit 10 may include one or more of an orientation sensor 17, distance sensor 15 and a light sensor 13. Each or several of such sensors may be positioned in variable locations on the lighting unit in order to obtain and collect necessary data for interpretation of install characteristics of the lighting unit. Appropriate measurements of the installed luminaire and/or distance from it to ceilings, walls or working surfaces to be illuminated may be detected in order to appropriately modify the light output characteristics. The control and/or control system 63 and sensors 13, 15 and 17 may be electrically connected or in communication with each other so that the data collected may be utilized by the controller for modifying and adapting light output characteristics.

In various embodiments, each of the plurality of sensors may be separate and/or combined. For example, in some embodiments, an onboard orientation sensor 17 may be utilized along with the distance center to automatically configure the luminaire based upon the properties detected. The orientation sensor may sense one or more of heading, pitch and roll. Heading generally references the orientation of the particular element to the Earth's magnetic poles or the rotational orientation of the element about a nadir axis. Heading may be measured utilizing one or more sensors. For example, an orientation sensor may include, in some versions, a digital compass (such as a magnetometer, gyrocompass, and/or hall affect sensors) that provides an electronic output indicative of orientation to the earth's magnetic poles. Pitch may also be detected which references the rotation of the particular element about a first axis perpendicular to the nadir axis and may be measured utilizing one or more sensors such as, for example, a gyroscope and/or an accelerometer. Roll references the rotation of the particular element about a third axis perpendicular to the nadir axis and the second axis and may be measured utilizing one or more sensors such as, for example, a gyroscope and/or an accelerometer.

In some embodiments, one or more of the orientation sensors may only sense heading. Also in some embodiments a single orientation sensor may sense multiple values of heading, pitch and/or roll. For example, in various embodiments, a three-axis or multi-axis electronic compass or accelerometer may be utilized to determine heading, pitch and roll.

As shown in the various embodiments, the orientation sensor 17 may be mounted directly to one of the surfaces of the lighting unit in order to appropriately determine orientation of the lighting unit. The orientation sensor may be mounted directly on the lighting unit on any of the plurality of surfaces or in associated relationship to the lighting unit. Such associated relationship may include separate, connected, communicative or other install relationships such that the orientation of the lighting unit 10 and/or the luminaire 50,30, 20 may be detected.

In other embodiments, one or a plurality of distance sensors 15 may be employed and positioned in various locations on the lighting unit. Distance sensors 15 may be utilized for measuring the distance from the lighting unit/luminaire towards the ceiling, floor, work surface or other install surface. Distance sensors may include various range finders, ultrasonic emitters, optical detectors, among various exemplary embodiments, each of which provides data output related to measurements between the sensor and/or install surface and other surfaces. Low resolution and high resolution distance sensors may be implemented in order to appropriately detect surfaces to be illuminated and differentiate between various structures.

In various embodiments, light sensors 13 may also be positioned on or in relation to the lighting unit or luminaire. Optional light sensor 13 may be implemented in a commissioning stage to determine reflectance values of emitting light from within a light fixture or may be utilized as feedback to the controller for optimum control of the lighting surfaces 12.

In various embodiments, these and other sensors may be associated with the lighting unit or luminaire and not mounted directly thereon. Such sensors may be utilized to commission the lighting unit and luminaire and determine installed lighting conditions. In various embodiments, one or more of the sensor outputs may be utilized for setup configuration, determination of luminaire type and the like.

The lighting unit 10 may be installed in a number of different form factors and may be included, for example, within luminaire 20, 30 50 as shown in FIGS. 2A, 2B and 2C. As depicted in the various examples, a mounting surface 52 is provided upon which the luminaire and/or lighting unit may be installed. The luminaire may be installed in variable positions and orientations requiring individualized and unique light output characteristics. For example, FIG. 2A depicts a pendant installation. Such installation configuration may indicate an indirect light requirement wherein up-light is desired to reflect light from the ceiling surface. Controller 63 may examine such install data readings in order to define the type of location and necessary affect based a number of rules. Such rules may define proper combination of both functional and decorative effects appropriate for such associated and sensed data.

In various embodiments and shown in the example of FIG. 2B, the luminaire 50 may be mounted against the ceiling thereby indicating either direct down light or a ceiling wash effect is appropriate. Sensor data received by the controller from the plurality of sensors mounted on the luminaire or lighting unit associated therewith, may detect a near zero distance between the fixture/unit and ceiling. Such measurement combined with a generally horizontally orientation may indicate a down light and/or ceiling wash effect is appropriate.

In various embodiments, controller 63 obtains, reads or is in communication with the plurality of sensors and sensor data to determine desirable lighting effects based upon a set of rules. Such rules may utilize sensor value combinations with different and desired lighting effects.

In some embodiments, as shown in FIG. 2C, a wall mount of the luminaire 50 directly on wall surface 53 may indicate an orientation of a vertical installation. Further, distance data may determine positioning at near zero between the wall and the luminaire. Various rules may be provided indicating to the controller that a wall wash effect is preferable thereby adjusting light either upwards and/or downwards along the wall depending upon the location of the luminaire 50 on the wall and the proximity of the luminaire with respect to the ceiling and the floor or other surface to be illuminated.

Thus, in the multiple embodiments and examples of FIGS. 2A, 2B and 2C, a number of output characteristics may be implemented utilizing sensed data in order to adjust and modify light output on more than one side and/or direction dependent upon the appropriate install characteristics and sensed data. Once the lighting unit/light fixture determines environmental data representing mount characteristics, the controller automatically adjusts and modifies its light output characteristics.

In various embodiments, the distance sensor 15 may have low, medium or high resolution and be placed in multiple locations in order to better assess the surface type to be illuminated. Such information may be utilized in order to adjust the appropriate light output characteristics and lighting effects based upon the sensed surfaces detected. For example, illumination surface characteristics may include working tables, narrow computer desks, large meeting tables and the like, all of which may be detected by sensors. Both functional and decorative illumination characteristics may be implemented based upon detected distance, and the functional characteristics of the surface being scanned and detected.

Figure 3A:
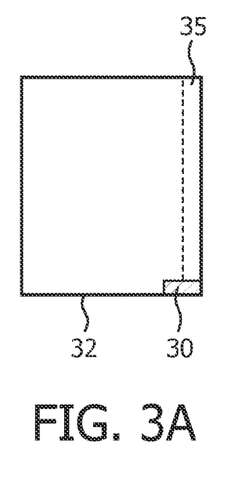
FIG. 3A illustrates an embodiment of an exemplary lighting fixture utilizing a modifiable lighting unit or other modifiable lighting source as described herein.
Figure 3B:
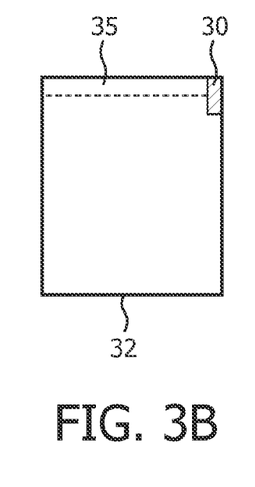
FIG. 3B illustrates another embodiment of an exemplary lighting fixture utilizing a modifiable lighting unit or other modifiable lighting source as described herein.
Figure 3C:
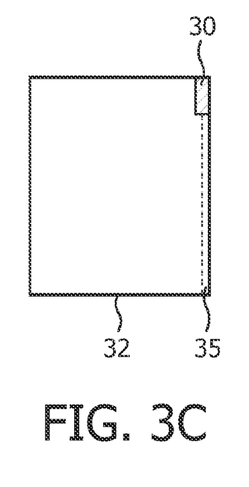
FIG. 3C illustrates a further embodiment of an exemplary lighting fixture utilizing a modifiable lighting unit or similar lighting source as described herein.

In some embodiments, as shown in FIGS. 3A, 3B and 3C, the light fixture or lighting unit 30 may be capable of producing lighting effects on multiple sides. Some alternative embodiments may utilize multiple distance sensors positioned on various surfaces in combination with multiple light output surfaces. In some examples, if the distance data for one of the distance sensors on one side is zero with a horizontal orientation as depicted in FIG. 3A, the controller may create an asymmetric wall washing effect 35 towards the blocked side of the module.

In other embodiments, if the light fixture 30 is mounted vertically against the ceiling, a ceiling wash effect as depicted in FIG. 3B may be created thereby allowing the lighting unit to modify its light output characteristics to illuminate as a ceiling wash effect based upon the plurality of rules associated with such sensed data.

Alternatively and in other embodiments as shown in FIG. 3C, an installation of the light fixture 30 against a wall 32 may require an illumination pattern 35 indicative of a standard wall washing effect from above wherein the module detects orientation of a vertical installation and as well, detects distance from the ceiling to be approximately zero. In such embodiment, the luminaire may adjust and modify its light output characteristics for wall washing from above to create associated and desirable wall wash illumination pattern 35.

Figure 4:
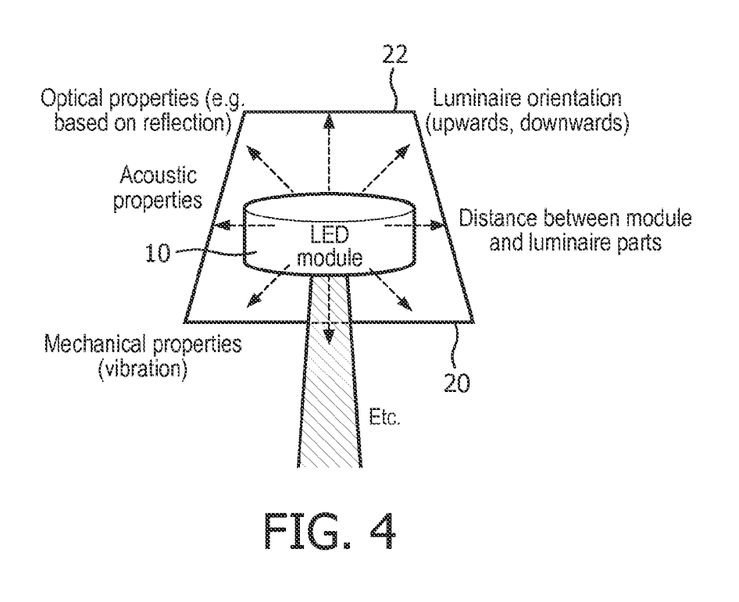
FIG. 4 illustrates an embodiment of an exemplary luminaire utilizing a lighting unit as described herein.

In still other embodiments, the lighting unit 10 and associated light fixture 20 depicted in FIG. 4 all utilization of a universal lighting unit which may detect the properties and/or type of luminaire in which it is mounted. In the depicted embodiment, the lighting unit 10 may be installed within the luminaire or light fixture 20 and may detect the positioning of various of light fixture parts 22. In various embodiments, a method and apparatus may be provided for such lighting unit which detects the property and type of luminaire or light fixture in order to auto-configure and adjust its light output characteristics based upon detected properties. The lighting unit 10 thus does not require direct communication with the light fixture 20 in order to detect appropriate auto-configuration properties.

In such an implementation, finger-printing of the lighting unit 10 within the luminaire 20 may be implemented by measurement of a plurality of properties of the luminaire such as acoustic, light, mechanical and other optical properties, as well as other mechanical and installation properties such as orientation. Luminaire parts 22 may be sensed and data forwarded to the controller. Such data may be then matched to an associated properties database of luminaire types with associated luminaire detected commissioning data and related properties associated with the installed sensors. Such table stored in the database 65 may indicate related luminaire types based upon sensed data allowing the controller to auto-configure the light output surfaces based upon detected data during the finger-printing stage. Based upon such data and the associated luminaire type closely matching the sensed data, the controller can properly adjust the lighting unit to generate associated light output characteristics necessary for the determined light fixture/luminaire which is listed in the associated database. The controller may then send associated control commands to the lighting surfaces in order to adjust and modify the light output characteristics of various properties.

Thus, various methods and apparatus are provided which allow an auto configuration module and method to appropriately determine the installed luminaire properties and thus automatically configure itself based upon such properties. Such auto configuration and detection may utilize the finger-printing technique discussed wherein the lighting unit measures specific properties of the light fixture in order to identify the exact type or a similar type of luminaire matching those properties within the data base. Alternatively, such lighting unit may measure and detect various limited properties of the luminaire such as size or other configuration aspects which directly influence the light effects and light output, such as for example, whether it is oriented in an vertical or a horizontal position; surface distance; distance to ceiling and/or wall; size of luminaire; distance to diffusers; and other light effect influencing properties. Various other techniques may be utilized based upon the utilization of sensor data which may be directly transmitted to a controller which may then auto-configure the light unit based upon detected properties.

Figure 5A:
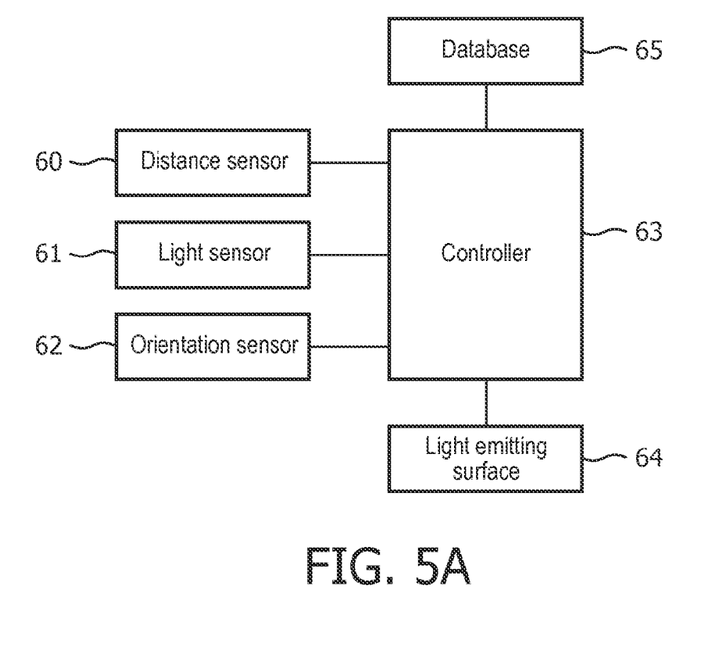
FIG. 5A illustrates a diagram of the elements of one embodiment of a lighting unit as described herein.

In various embodiments and as depicted in FIG. 5A, a controller 63 may be implemented for receipt of the data from the various sensors in order to properly auto configure the lighting unit. The controller may be a controller specifically integrated in the lighting unit or an associated controller in communication with the various other structures. Electronic communication between elements may be direct, wired, non-wired, networked or based upon other compatible interconnectivity. The controller 63 may read data from a directly attached sensor, such as the distance sensor 60, light sensor 61 and orientation sensor 62. Alternatively, such data may be transmitted either in a network configuration, direct wired configuration or alternative configuration wherein data is merely transmitted remotely. An associated memory storage unit or database 65 may be referenced by the controller in order to properly match the associated data, either singularly or in plurality, in order to properly fingerprint and/or identify the matching luminaire or light fixture and configure the various light emitting surfaces 64 on the lighting unit.

In various embodiments, the lighting unit may be separated into individual components to include a plurality of lighting surface separately mounted but individually controlled by the controller. As well, the lighting surfaces may be either unified, subdivided into subgroups or have individual lighting elements thereon, each of which may be controlled by the controller in order to produce the appropriate configuration and light output characteristics associated with the finger-printed and identified luminaire.

Figure 5B:
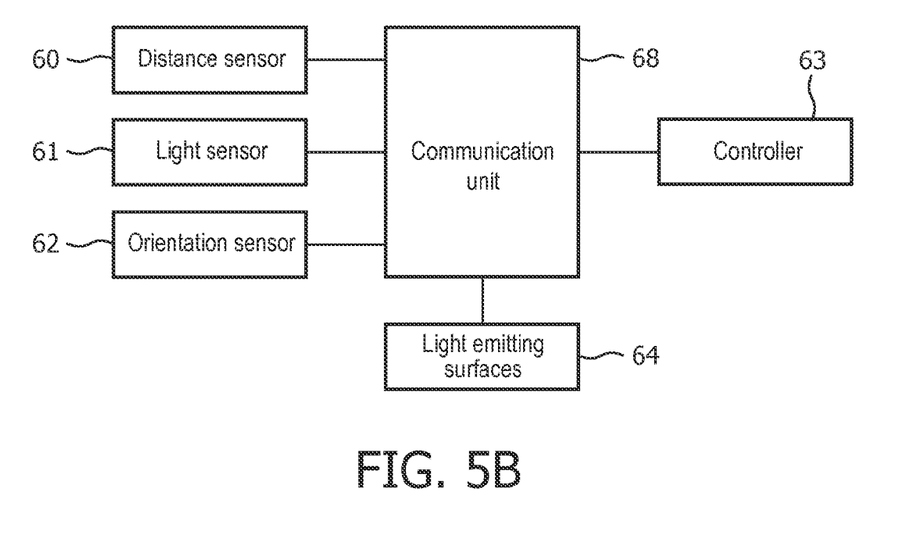
FIG. 5B illustrates a diagram of the elements of one embodiment of a lighting unit as described herein.

Further, as depicted in FIG. 5B, the controller 63 may be remotely in communication with the various sensors, light emitting surfaces and database. In such embodiment, a communication unit 68 may be integrated with the luminaire to maintain dedicated communication with the controller. In various embodiments the controller could be a smart bridge wherein the sensors communicate information to the communication unit of the luminaire which is maintained in wireless connectivity with the smart bridge/remote controller. The smart bridge control may then analyze the data and access a local or remote database to determine appropriate luminaire positions and settings. In various embodiments, this remote controller may utilize cloud based analysis and computing as well via a secondary communication to the internet or other network. Various settings can be determined and calculated and sent to the luminaire for implementation through the communication unit of the luminaire or lighting unit. The description and term controller as used herein is meant to confer concepts and structure of either direct connectivity or remote connectivity, as described.

Figure 6:
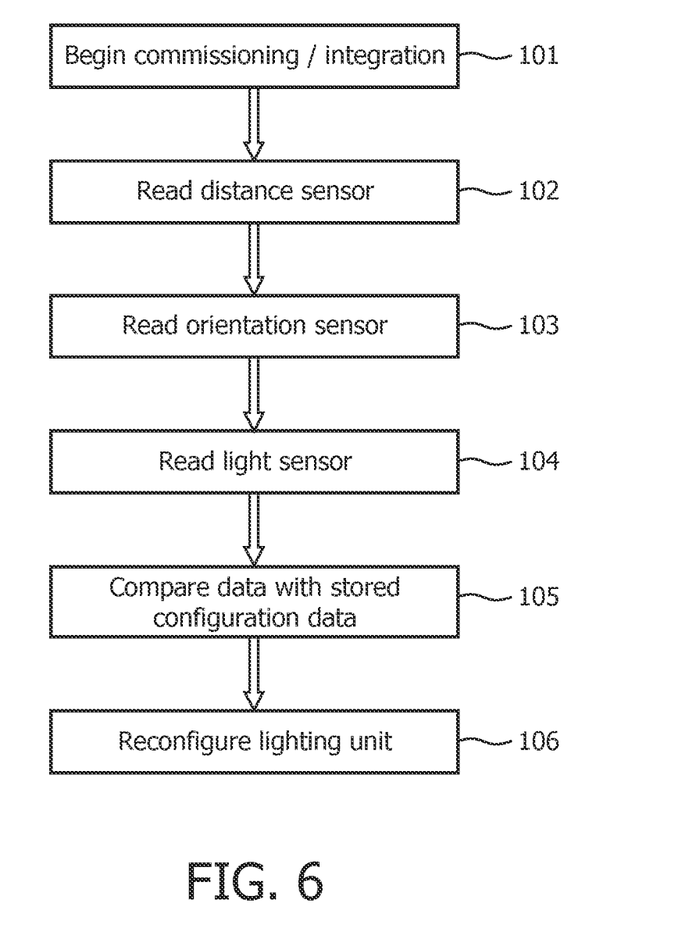
FIG. 6 illustrates a flowchart of proactively modifying and reconfiguring the lighting unit of the present invention based on sensor data and comparing said data to stored values.
Figure 7:
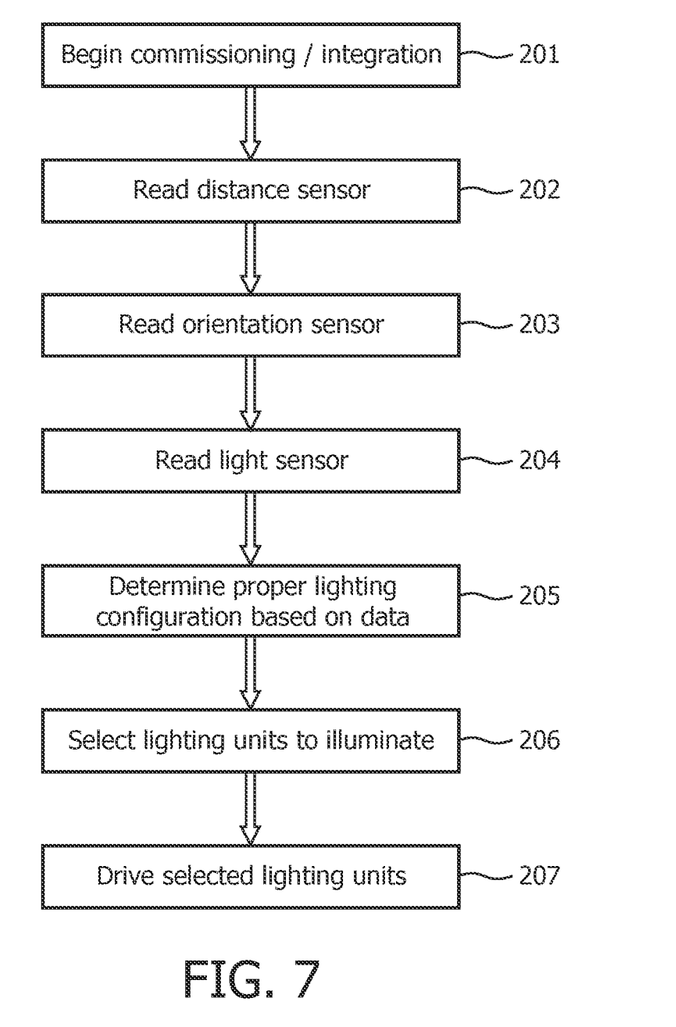
FIG. 7 illustrates a flowchart of adjusting one or more characteristics of a light output based on sensed data.

Various methods and implementations for commissioning and integration of the lighting unit within a light fixture may be implemented as shown in FIG. 6. Commissioning and integration may begin at step 101 wherein the various sensors may be polled such as the distance sensor at step 102, orientation sensor at step 103 and a light sensor at step 104. Polling may occur in sequence or concurrently. Calibration may be implemented at step 105 for each installed lighting unit. Such calibration procedure can include, for example, placing the module inside a specific luminaire and flashing light from the lighting surfaces 12 and reading the data from the sensors. Such detected optic data may be utilized for commissioning procedures. Sensor data may then be matched with table data stored in the associated database 65. Various tolerances may be allowed for each data set in order to appropriately distinguish the multiple configurations and luminaire specifications. Each of the sensor data's may be read and compared individually or in combination. Once the data is compared with the stored configuration data at step 105, the controller may then select the appropriate configuration necessary and reconfigure the lighting unit in step 106.

Alternatively, a lighting unit may determine external environmental installation specifications which are detectable by the plurality of sensors. Such functional installation is shown in the various figures, including FIGS. 2A, 2B and 2C, as well as 3A, 3B and 3C. Determination of appropriate light output characteristics begins at with step 201. Sensor data may be read at step 202, orientation sensor data may be read at 203 and light sensor date may be read at step 204. Each of the sensor data may be done individually, collectively or in various combinations and in an order necessary to determine the type of installation. The controller may determine proper lighting configuration based upon a plurality of rules matching the measurements. The controller selects the appropriate lighting surfaces to illuminate at step 206 and appropriately drives the selected lighting surfaces and associated lighting units at step 207 based upon such rules and determined configuration.

Alternatively, there may be situations in which the orientation based light effect does not result in the appropriately desired light effect by the user. In such instances, the lighting unit and/or luminaire may be equipped with a user input which enables the user to modify the detected functional or decorative light output characteristics. Further, in some embodiments, manual adjustment or selection of the required output characteristics may be entered by a user.

Although only a single controller is depicted within the various embodiments shown and described herein, multiple controllers individually driving light emitting surfaces and/or driving and controlling subgroups of light emitting surfaces may be provided. One or more of such plurality of light emitting surfaces, luminaires and/or lighting units may be controlled by a common master controller having different configurations being sent to each sub-element thereof and/or common configurations being sent to one or more sub-elements. Also, and in alternative embodiments, multiple fixtures and/or lighting units may be networked for inner-operability and control of a singular or plurality of controllers. For example, in various embodiments, multiple lighting units may communicate through coded lighting transmitted signals, for example, via pulse width modulation of one or more LEDs. One or more of the lighting units and/or luminaires may optionally serve as a master for other lighting units and/or luminaires in some embodiments. In other embodiments, the lighting units and/or light fixtures may share detected information on distance, light and orientation with other elements that do not have such sensors and detection structure. In some embodiments, the luminaires and/or lighting units may share current lighting settings, planned lighting settings, installed configuration settings and functional or aesthetic determination settings in order to align the lighting effect among a plurality of lighting units so that a coherent light output characteristics can be created.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Also, reference numerals appearing in the claims are provided merely for convenience and should not be construed as limiting in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An adaptable and controllable lighting unit, comprising:
   at least a first light source and a second light source each having a light emission surface;
   an orientation sensor;
   a distance sensor; and
   a controller electronically connected to said first light source and said second light source, said controller operable to modify at least one light characteristic of said first light source and said second light source;
   wherein said controller reads data from said orientation sensor and said distance sensor to modify said at least one light characteristic of said first light source independent of modification of said at least one light characteristic of said second light source when said data satisfies first criteria.

2. The lighting unit of claim 1, wherein said first light source includes one or more LEDs.

3. The lighting unit of claim 1, wherein said first light source and said second light source emit lighting in opposing directions.

4. The lighting unit of claim 1, wherein said at least one modified light characteristic includes direction of light emitted by said light emission surface.

5. The lighting unit of claim 1, wherein said at least one modified light characteristic includes the distribution shape of light emitted by said light emission surface.

6. The lighting unit of claim 1, wherein said controller modifies the direction of light emission from said lighting unit based on said data from said orientation sensor or said distance sensor.

7. The lighting unit of claim 1, wherein said lighting unit includes a memory storage unit, said controller configured to access said memory storage unit and compare said data from said orientation sensor and said distance sensor to stored values on said memory storage unit, said stored values including an associated light characteristic value related to said data from said distance sensor and said orientation sensor.

8. The lighting unit of claim 1, wherein said data from said distance sensor includes a distance to a mounting surface on which said lighting unit is mounted.

9. A method of controlling illumination from a lighting unit, comprising:
   determining an orientation of said lighting unit by reading orientation data from an orientation sensor;
   determining a distance value for said lighting unit by reading distance data from a distance sensor; and
   adjusting at least one light output characteristic of said lighting unit based on said orientation data and said distance data;
   wherein said adjusting at least one light output characteristic is based on comparing said orientation data and said distance data to a plurality of table data, said table data including an associated luminaire type related to said distance data and said orientation data.

10. The method of claim 9, wherein said at least one light output characteristic includes a light output direction of said lighting unit.

11. The method of claim 9, wherein said distance data includes a distance to a mounting surface on which said lighting unit is mounted.

12. The method of claim 9, wherein said at least one light output characteristic includes a light output distribution shape of said lighting unit.

13. The method of claim 9, wherein said adjusting at least one light output characteristic includes selectively activating at least one of a plurality of lighting surfaces mounted on said lighting unit.

14. The method of claim 9, wherein said adjusting at least one light output characteristic includes controlling a plurality of LEDs using a controller to modify said at least one light output characteristic.

15. An LED-based lighting unit configured for controllable light output, the lighting unit comprising:
   a first and a second LED light source electronically connected to a controller;
   at least one light sensor electronically connected to said controller and associated with said first light source;
   at least one distance sensor electronically connected to said controller and associated with said first light source; and
   at least one orientation sensor electronically connected to said controller and associated with said first light source;
   wherein said first light source is mounted related to a first light output axis, said second
   light source is mounted relative to a second light output axis different than said first light output axis;
   wherein said controller reads data from said orientation sensor and said distance sensor to selectively activate said first and second LED light source, and wherein said controller activates said first light source independent of activation of said second light source when said data satisfies first criteria.

16. The lighting unit of claim 15 including a memory storage unit associated with said controller.

17. A luminaire mountable adjacent a mounting surface and comprising the lighting unit of claim 15.

18. A luminaire suspended from a ceiling and comprising the lighting unit of claim 15.

19. The lighting unit of claim 15, wherein said data from said distance sensor includes a distance to a mounting surface on which said lighting unit is mounted.

* * * * *